United States Patent
Imgram et al.

(10) Patent No.: US 7,196,292 B2
(45) Date of Patent: Mar. 27, 2007

(54) METHOD FOR CONTROLLING A COOKING PROCESS

(75) Inventors: Judith Imgram, Hanau (DE); Andrea Jürgens, München (DE); Katharina Wallenwein, Landsberg/Lech (DE); Thomas Garner, Landsberg/Lech (DE); Michael Greiner, Landsberg (DE); Jürgen Klasmeier, Landsberg (DE); Thomas Schreiner, Hurlach (DE)

(73) Assignee: Rational AG, Landsberg/Lech (DE)

( * ) Notice: Subject to any disclaimer, the term of this patent is extended or adjusted under 35 U.S.C. 154(b) by 0 days.

(21) Appl. No.: 10/547,818

(22) PCT Filed: Mar. 1, 2004

(86) PCT No.: PCT/DE2004/000379

§ 371 (c)(1),
(2), (4) Date: Aug. 1, 2006

(87) PCT Pub. No.: WO2004/077952

PCT Pub. Date: Sep. 16, 2004

(65) Prior Publication Data

US 2007/0000905 A1 Jan. 4, 2007

(30) Foreign Application Priority Data

Mar. 5, 2003 (DE) ................. 103 09 486

(51) Int. Cl.
*A21B 1/24* (2006.01)
*A21B 1/40* (2006.01)

(52) U.S. Cl. ............. 219/401; 219/413; 219/494; 219/497; 99/467; 426/510

(58) Field of Classification Search ............. None
See application file for complete search history.

(56) References Cited

U.S. PATENT DOCUMENTS

| | | | |
|---|---|---|---|
| 3,947,241 A * | 3/1976 | Caridis et al. | 99/467 |
| 4,167,585 A * | 9/1979 | Caridis et al. | 426/510 |
| 5,083,505 A * | 1/1992 | Kohlstrung et al. | 99/331 |
| 5,272,963 A * | 12/1993 | Del Fabbro | 99/468 |
| 5,780,818 A | 7/1998 | Hansson | |
| 6,497,907 B2 | 12/2002 | Hofer | |
| 6,753,027 B1 | 6/2004 | Greiner et al. | |

FOREIGN PATENT DOCUMENTS

| | | |
|---|---|---|
| DE | 43 41 410 | 6/1995 |
| DE | 198 43 500 | 4/1999 |
| DE | 199 45 021 | 4/2001 |
| EP | 0 386 862 | 9/1990 |
| EP | 0 567 813 | 11/1993 |
| WO | WO-01/59370 | 8/2001 |

OTHER PUBLICATIONS

Patent Abstracts of Japan vol. 012, No. 297, Mar. 26, 1988, JP 63 068048.
International Search Report issued in PCT/DE2004/000379 mailed on Aug. 23, 2004.
International Preliminary Examination Report issued in PCT/DE2004/000379 issued on May 20, 2005.
English Translation of International Report on Patentability issued in PCT/DE2004/000379 dated Mar. 2, 2006.

* cited by examiner

*Primary Examiner*—Joseph Pelham
(74) *Attorney, Agent, or Firm*—Marshall, Gerstein & Borun LLP

(57) ABSTRACT

A method for controlling a cooking process in the cooking chamber of a cooking device according to the point of condensation inside the cooking device includes introducing at least one cooking item and at least one accessory such as a gastronomic container, a plate, tin plate, a support, a suspended ladder, a kiln tray and/or kiln tray cart and/or at least one reference body into the cooking chamber; at least partially determining during the cooking process at least one climate parameter, especially one relating to temperature and moisture, in the cooking area, or on the cooking item, or on the accessory or on the reference body; determining the actual extent by which the point of condensation is exceeded or is not achieved on the cooking item, accessory and/or reference body; and adapting the climate parameter in the cooking chamber during the cooking process according to the extent by which the point of condensation is exceeded or not achieved such that the climate inside the cooking chamber, especially the amount of moisture therein, the supply of moisture to the cooking chamber and/or the discharge of moisture from the cooking chamber is adjusted according to the point of condensation.

25 Claims, No Drawings

METHOD FOR CONTROLLING A COOKING PROCESS

RELATED APPLICATIONS

This is the U.S. national phase of International Application No. PCT/DE2004/000379 filed Mar. 1, 2004, the entire disclosure of which is incorporated herein by reference and claims priority to German application number 103 09 486.5 filed Mar. 5, 2003.

TECHNICAL FIELD

The present application pertains to a system for controlling a cooking process in the cooking space of a cooking appliance as a function of the dew point in the interior of the appliance.

BACKGROUND ART

One skilled in the art is familiar with many methods for controlling cooking processes. The reason for this is that, depending on the type of food to be cooked and on the size and amount of food, a different cooking process is often required to obtain optimal results in each specific case. The same is also normally true for the reconstitution of precooked food. Although precooked food items can be reconstituted by using a preset timing program to control the steam production system or by using a single- or multi-stage timing program to control the humidity, uncontrolled condensation, leading to the formation of undesirable puddles, still occurs frequently. Another frequent occurrence is that the food to be cooked dries out as a result of insufficient humidity. The reason for these problems is that the temperature and humidity conditions prescribed by the reconstitution program are not oriented around the actual conditions present during the course of the cooking process.

DE 198 43 500 A1 describes a method for operating a household appliance for nonpressurized steam-cooking, in which the amount of steam is regulated as a function of a reference value $T_D$ on the basis of the temperature value detected by a temperature sensor. The reference temperature value $T_D$ is obtained by heating water in the steam generator of the household appliance until the temperature in the cooking space stops increasing. This reference value is preferably determined while the cooking space is empty, that is, before or after it is washed. By means of the procedure described in DE 198 43 500 A1, it is said that it is possible to adjust the variables precisely to the ambient conditions even if the temperature measured in the cooking space deviates from the actual temperature as a result of, for example, the manufacturing tolerances of the temperature sensor. In particular, the idea is to prevent the steam temperature from being set too low, because this has a negative effect on the cooking times and thus on the cooking results. Another reason why it is necessary to prevent the measured temperature from dropping too low is that the steam generator would otherwise keep operating continuously. The method according to DE 198 43 500 A1 is intended to eliminate these disadvantages. Nevertheless, the method of DE 198 43 500 A1 still does not ensure that uncontrolled condensation, leading to the formation of puddles and thus to a permanent impairment to the quality of the food, will not occur during the reconstitution of precooked food or during the cooling process after the completion of cooking.

A method for controlling a cooking process in the cooking space of a cooking appliance as a function of a dew point is known from WO 01/59370 A1, according to which the climate in the cooking space is controlled as a function of climate parameters (temperature, humidity, and pressure), which are determined by sensors. Once the dew point is determined, the steam pressure can be selected, and by adjusting this pressure with precision, the food being cooked can be prevented from drying out.

DE 43 41 410 A1 describes a baking and roasting oven with an electrically heated cooking space, a heated steam generator for the cooking space, and a hot-air blower, where a measuring device, which is designed as a humidity sensor and forms part of a measurement evaluation unit, is installed in the area of the cooking space to detect the steam concentration. A condensate trap with a temperature sensor is also installed in the cooking space, this trap being connected downstream from a cooling unit. The climate of the cooking space can be controlled automatically by the measurement and evaluation of the concentration of steam in the cooking space.

EP 0 567 813 A1 describes an arrangement for measuring the amount of moisture present in a cooking appliance. This arrangement comprises a reference body with two sides, one of which is exposed to the climate of the cooking space, whereas the other is cooled. By measuring the temperature on both sides and the temperature of the cooking space, it is possible to determine the dew point inside the cooking space atmosphere. The relative humidity in the cooking space can then be derived from the determined dew point on the basis of a set of stored curves.

U.S. Pat. No. 5,780,818 discloses a method for controlling a cooking process with hot air and steam, where phase transitions in the food being cooked or in the cooking space climate are derived from the course of the temperature measured at certain points inside the cooking space. Then, on the basis of these phase transitions, it can be concluded when the steam content in the cooking space climate should be lowered to a value below the saturation value.

A method for controlling a cooking process as a function of at least two temperature values acquired from a cooking process sensor, which can be inserted at least part of the way into the food item being cooked, is known from DE 199 45 021 A1. Via the thermokinetics of the detected temperature values, specific parameters of the food and/or of the cooking appliance are determined, and the specific food and/or appliance parameters thus determined are used to control the cooking process.

Finally, EP 0 386 862 A1 discloses a cooking appliance with a cooking space and a device for introducing water in liquid form or as steam into the cooking space. In addition, a device for discharging moisture from the cooking space, at least one humidity sensor in the cooking space, and an automatic controller, which actuates the device for discharging moisture from the cooking space and/or the device for introducing water, are also provided.

SUMMARY OF THE DISCLOSURE

The present application discloses a method for controlling a cooking process which does not suffer from the disadvantages of the state of the art and which in particular ensures that uncontrolled condensation, especially undesirable puddling on the accessories such as gastronomy containers, plates, baking sheets, supports, etc, will not occur no matter what situation may arise during the reconstitution and/or cooking process and also that the food being cooked will not dry out.

DETAILED DESCRIPTION

Accordingly, a method for controlling a cooking process in the cooking space of a cooking appliance as a function of the dew point in the interior space of the appliance is provided, which comprises the following steps:

(a) the introduction of at least one food item to be cooked, at least one accessory, and at least one reference body with the same thermal behavior as that of the accessory into the cooking space;

(b) the determination of the climate parameters, i.e., temperature and humidity, at the reference body during the cooking process;

(c) the use of an evaluation unit to determine, as a function of the climate parameters determined in step (b), the actual extent to which the temperature at the reference body is above or below the dew point; and (d) the adjustment of the humidity and/or temperature in the cooking space during the cooking process as a function of the extent, determined in step (c), to which the temperature is above or below the dew point, so that the climate in the cooking space is controlled as a function of the dew point.

The disclosed method offers the advantage that it is possible effectively to prevent both the formation of condensate puddles on the food item being cooked and/or on the accessory, especially on the support holding the food, and the drying-out of the food surface.

It is preferable for the accessory to be a gastronomy container, a plate, a baking sheet, a support, a set of horizontal bars from which food items can be suspended, a tray rack, and/or a tray rack trolley.

According to another proposal, the humidity in the cooking space, the moisture input to the cooking space, and/or the discharge of moisture from the cooking space is controlled as a function of the dew point in step (d) to obtain the desired climate in the cooking space.

It is advantageous to repeat steps (b)–(d) at least once during the cooking process or to allow these steps to run continuously at least during certain phases of the process.

According to an embodiment of the disclosed method, the temperature behavior, especially the warm-up behavior, of the accessory and/or of the reference body is used in itself and/or in correlation with the temperature behavior, especially the warm-up behavior, of the food item in the cooking space as the a basis for the dew point-dependent climate control.

An embodiment in which the humidity and/or the temperature in the cooking space is adjusted in step (d) in such a way that the temperature does not exceed or fall below the dew point or does so only to a predeterminable extent has been found to give especially good results.

According to another aspect of the disclosed method, the humidity in the cooking space is measured by means of a separate humidity sensor, by means of a cooking process sensor, and/or by means of a humidity measuring device belonging to the cooking appliance itself.

It is also possible according to the disclosed method to use a separate temperature sensor and/or a cooking process sensor to measure the temperature and/or the humidity required to determine the dew point at the reference body, at the surface of the reference body, at the accessory, and/or at the surface of the accessory, especially of a support for the food or of a tray rack trolley.

It can be provided according to the disclosed method that the cooking process sensor is inserted, introduced, or integrated at least partially into the accessory or the reference body.

An especially advantageous embodiment of the disclosed method consists in discharging the moisture from the cooking space when the temperature falls below the dew point at the surface of the reference body or in introducing moisture into the cooking space when the temperature reaches or exceeds the dew point at the surface of the reference body.

According to another aspect of the disclosed method, it is advisable to subject the reference body and/or the accessory to more-or-less the same pretreatment as the food to be cooked, especially to the same type of temperature treatment, before the body or accessory is introduced into the cooking space.

In another embodiment of the disclosed method, at least a part of the accessory can be used as the reference body.

An elaboration of the disclosed method, furthermore, is characterized in that the humidity sensor, the cooking process sensor, the humidity measuring device, and/or the temperature sensor is or are connected to the cooking appliance's control unit, which can be of the open-loop and/or closed-loop type.

Especially good cooking or reconstituting results are also obtained when the temperature of the accessory and/or the humidity of the cooking space is adjusted while the food is cooling in such a way that the temperature does not exceed the dew point at the accessory.

In an advantageous embodiment of the disclosed method, the temperature behavior of the accessory and/or of the reference body is known, stored, and/or retrieved either in itself or in correlation with the food to be cooked and/or with a standardized food item, especially under consideration of the amount of food loaded into the appliance.

Finally, another aspect of the disclosed method is characterized in that at least one electrical conductivity measurement at the reference body and/or a separate conductivity measuring device, especially near the surface of the reference body, is used to determine the moisture content and especially to determine whether the temperature is above or below the dew point in the cooking space, especially at the surface of the reference body. So that the dew point can be controlled on the basis of electrical conductivity measurements, it is possible, for example, to provide capacitative hygrometers or lithium chloride dew point sensors. The dew point or humidity in the cooking space can also be controlled on the basis of the measurement of the resistance of two closely adjacent wires, which, for example, are present on the bottom surface of the cooking support. Determination of the resistance then makes it possible to evaluate directly whether the temperature is above or below the dew point.

The present method was based on the surprising realization that, by detecting and controlling the temperature of accessories in the cooking space, especially the temperature of food support surfaces such as plates and/or via the determination and control of the dew point at or in the area of the surface of the food being cooked, of the accessory parts and/or of reference bodies, it is possible to keep the moisture content of the cooking space at the optimum value at all times, which means that there will never be any uncontrolled condensation with undesirable puddling on, for example, the food support surfaces. The moisture content or the relative humidity in the cooking space can be adjusted as a function of the temperature setting or of the measured temperature on the accessory part, and it is also possible to regulate the temperature on an accessory part as a function of the relative humidity in the cooking space. The temperature of the accessory parts can be conveniently determined without additional effort by the use of temperature sensors, e.g., thermocouples. Cooking process sensors such as those described in DE 199 45 021 A1 can also be used. A cooking process sensor of this type can have a temperature-sensitive tip, which is in contact with an accessory part or a reference body or which can be connected to a separate temperature sensor attached to the accessory part or to the reference body. By using reference bodies which behave thermally the same way as the accessory parts, especially the same way as the food supports such as plates, the cooking space climate can be adjusted easily and reliably as a function of the actual conditions, as a result of which the uncontrolled condensation of liquid can be suppressed.

The features of the invention disclosed in the previous description and in the claims can be essential, either individually or in any desired combination, to the realization of the invention in its various embodiments.

The invention claimed is:

1. Method for controlling a cooking process in a cooking space of a cooking appliance as a function of the dew point in the interior of the cooking appliance, comprising:
   (a) introducing at least one food item to be cooked, at least one accessory, and at least one reference body with the same thermal behavior as that of the accessory into the cooking space;
   (b) determining climate parameters of temperature and humidity at the reference body during the cooking process;
   (c) using an evaluation unit to determine, as a function of the climate parameters determined in step (b), the actual extent to which the temperature at the reference body is above or below the dew point; and
   (d) adjusting at least one of the humidity and the temperature in the cooking space during the cooking process as a function of the extent, determined in step (c), to which the temperature is above or below the dew point, so that the climate in the cooking space is controlled as a function of the dew point;
   wherein a sensor is used to measure at least one of the temperature and the humidity in the cooking space, on the basis of which the dew point at least at one of the reference body, the surface of the reference body, and the accessory, is determined, and wherein the sensor is inserted, introduced, or integrated at least partially into the accessory or the reference body.

2. Method according to claim 1, wherein the accessory is a gastronomy container or a plate or a baking sheet or a support or a set of horizontal bars from which food items can be suspended or a tray rack or a tray rack trolley.

3. Method according to claim 1, wherein, in step (d), at least one of the humidity in the cooking space, the input of moisture to the cooking space, and the discharge of moisture from the cooking space is regulated as a function of the dew point to obtain a desired climate in the cooking space.

4. Method according to claim 1, including repeating steps (b)–(d) at least once during the cooking process.

5. Method according to claim 1, including allowing steps (b)–(d) to proceed continuously at least during certain phases of the cooking process.

6. Method according to claim 1, wherein adjusting at least one of the humidity and the temperature in the cooking space so that the climate in the cooking space is controlled as a function of the dew point is based on a temperature behavior of the reference body.

7. Method according to claim 6, wherein the temperature behavior of the reference body comprises a warm-up behavior of the reference body.

8. Method according to claim 6, wherein adjusting at least one of the humidity and the temperature in the cooking space so that the climate in the cooking space is controlled as a function of the dew point is based on the temperature behavior of the reference body in correlation with a temperature behavior of the food being cooked in the cooking space.

9. Method according to claim 8, wherein the temperature behavior of the food being cooked comprises a warm-up behavior of the food being cooked.

10. Method according to claim 1, wherein at least one of the humidity and the temperature in the cooking space is adjusted in step (d) in such a way that the temperature does not exceed or fall below the dew point.

11. Method according to claim 1, wherein at least one of the humidity and the temperature in the cooking space is adjusted in step (d) in such a way that the temperature exceeds or falls below the dew point only to a predeterminable extent.

12. Method according to claim 1, further including discharging moisture from the cooking space when the temperature at the surface of the reference body falls below the dew point.

13. Method according to claim 1, further including introducing moisture into the cooking space when the temperature at the surface of the reference body reaches or exceeds the dew point.

14. Method according to claim 1, wherein at least one of the reference body and the accessory is subjected to more-or-less the same pretreatment as the food to be cooked before at least one of the reference body and the accessory is introduced into the cooking space.

15. Method according to claim 1, wherein at least one of the reference body and the accessory is subjected to more-or-less the same temperature treatment as the food to be cooked before at least one of the reference body and the accessory is introduced into the cooking space.

16. Method according to claim 1, wherein at least part of an accessory is used as the reference body.

17. Method according to claim 1, wherein the sensor comprises at least one of a humidity sensor, a cooking process sensor, a humidity measuring device, and a temperature sensor connected to an appliance control unit, which operates on at least one of an open-loop and a closed-loop control principle.

18. Method according to claim 1, wherein at least one of the temperature of the accessory and the humidity of the cooking space is adjusted during cooling of the cooked food in such a way that the temperature does not exceed the dew point at the accessory.

19. Method according to claim 1, wherein the temperature behavior of at least one of the accessory and of the reference body is at least one of known, filed, and retrieved in itself.

20. Method according to claim 19, wherein the temperature behavior of at least one of the accessory and of the reference body is at least one of known, filed, and retrieved in correlation with the at least one of food to be cooked and a standardized food to be cooked.

21. Method according to claim 19, wherein the temperature behavior of at least one of the accessory and the reference body is at least one of known, filed, and retrieved under consideration of the amount of food loaded into the cooking space.

22. Method according to claim 1, including using at least one of an electrical conductivity measurement at the reference body and a separate conductivity measuring device to determine the moisture content in the cooking space.

23. Method according to claim 22, wherein the electrical conductivity measurement is made near the surface of the reference body to determine the moisture content in the cooking space at the surface of the reference body.

24. Method according to claim 22, wherein the electrical conductivity measurement is made to determine whether the temperature is above or below the dew point.

25. Method according to claim 1, wherein the sensor comprises at least one of a humidity sensor and a temperature sensor.

* * * * *